UNITED STATES PATENT OFFICE.

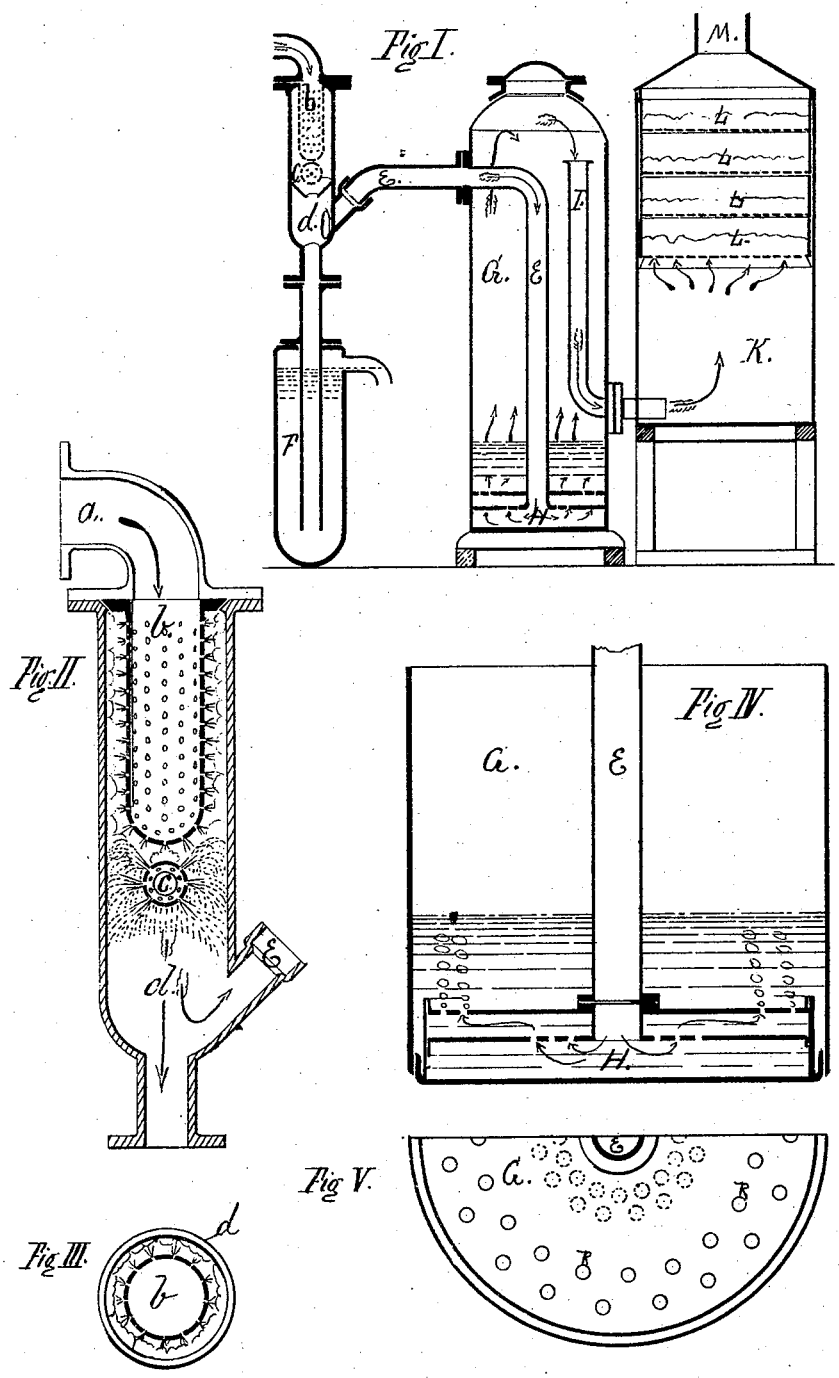

JOSEPH A. MILLER, OF PROVIDENCE, RHODE ISLAND.

IMPROVEMENT IN APPARATUS FOR PURIFYING AND DEODORIZING GASES.

Specification forming part of Letters Patent No. 153,453, dated July 28, 1874; application filed January 14, 1874.

*To all whom it may concern:*

Be it known that I, JOSEPH A. MILLER, of the city of Providence, in the State of Rhode Island, have invented a new and useful Improvement in Apparatus for Purifying and Deodorizing Gases; and I do hereby declare that the following is a full, clear, and exact description thereof, which will enable others skilled in the art to make and use the same, reference being had to the accompanying drawings forming part of this specification.

Figure I is a vertical section of the apparatus. Fig. II is a vertical section of the condenser and atomizer. Fig. III is a horizontal section of the same. Fig. IV is a vertical section of the washing-vessel, and Fig. V is a half-horizontal section of the same.

Similar letters refer to corresponding parts.

The object of this invention is to purify and deodorize the vapors and gases from tallow and lard rendering establishments, and so prevent the great nuisance of allowing such gases to mix with the air, impairing its value as a sustainer of life; and for that purpose I connect a pipe with the upper part of a rendering-tank, and convey the steam and noxious gases into the cylindrical perforated vessel $d$. This vessel is placed inside and concentric with the condenser $d$, so as to form an annular space between the outside of the vessel $b$ and the inside of the wall of the condenser $d$. The vessel $b$, which I call the atomizer, is perforated with a number of small holes, through which the vapor and gases are forced by the pressure in the tank; or a pump may be used to exhaust the steam and gases from the tank and force the same through the atomizer $b$. The object of dividing the vapor and gases into small streams is to increase the friction on the same, and so causing what is popularly called wire drawing. This and the violent impinging of the fine streams of heated vapor and gases cause rapid condensation and a dissociation of all matter mechanically mixed with the vapor, as also a separation of impurities held suspended in the same, which, by virtue of the difference in their specific gravity, separate when violently forced through fine holes and made to impinge on a surface which diverts their direction and at the same time reduces their temperature. When coal-gas is passed from the retort through this atomizer, and allowed to impinge against the outer walls of the chamber or cylinder $d$ with sufficient force, the different constituents of the gas are separated, and the tar and ammoniacal liquor can be drawn off, while the gas, nearly pure, may be further purified in the usual manner. After the vapors and gases have been thus as much as possible mechanically separated, they are condensed by the shower of cold water forced through the rose-sprinkler C, and the condensed vapor and the injection-water are allowed to flow into the vessel F, which forms the hydraulic seal and has a suitable overflow. The uncondensed gases pass through the pipe E into the washing-vessel G. In this vessel, as is more fully shown in Figs. IV and V, two plates, one above the other, are secured to the pipe E and connected to an outer ring, so as to form the inclosed space H, to which the gases pass from the pipe E. The vessel G, as is shown, is partly filled with cool water, which must be continually renewed and kept several degrees below the temperature of the atmosphere. The two horizontal plates have small holes, the lower having the holes near the center and the upper near the periphery of the plates; or this may be reversed, the lower plate having the holes near the periphery and the upper plate near the center. By this means the gases have to pass along the under side of these plates, which are preferably made of coarse cast-iron, and as the gases are much lighter than the water, they rise up through the holes in the first plate and against the lower surface of the upper plate; and in order to reach the holes in the second plate they must roll, as it may be called, along the plate, being pressed against the same by the water, and by this means the same are subjected to a certain amount of friction, and are thoroughly washed. So efficient is this method that the most obnoxious smelling gases will come from this washer perfectly pure and odorless, provided the water is kept cool and pure, and no further process would be required if the water-supply and the discharge are properly regulated. As, however, the object aimed at is to entirely prevent all possibility of noxious vapors entering the air, I pass the gases from the washer G to the purifier K, in which are any number of trays L, containing absorbent material, such as lime, earth, or charcoal, through which the gases are made to pass, and are discharged at M, preferably into a chimney or the furnace of a steam-boiler.

Having thus described my invention, I claim as new and desire to secure by Letters Patent—

1. The combination of the gas-atomizing tube $b$ and the rose-sprinkler C, for condensing and purifying gases, substantially as specified.

2. The processes of purifying the vapors and gases from rendering-tanks by passing the same in succession through the atomizer and condenser, the washer, and purifier containing absorbent material, substantially as and for the purpose specified.

3. The combination, with the central pipe E of the washer, of the distributing-plates, one perforated near the center and the other near the circumference, as and for the purpose specified.

JOSEPH A. MILLER.

Witnesses:
JOSEPH A. MILLER, Jr.,
HENRY J. MILLER.